Apr. 3, 1923.

N. GRANDE

MILK BOTTLE RECEPTACLE

Filed Mar. 3, 1922

1,450,772

INVENTOR.
Nicholas Grande
BY Jas. H. Griffin
ATTORNEYS.

Patented Apr. 3, 1923.

1,450,772

UNITED STATES PATENT OFFICE.

NICHOLAS GRANDE, OF NEW YORK, N. Y.

MILK-BOTTLE RECEPTACLE.

Application filed March 3, 1922. Serial No. 540,715.

*To all whom it may concern:*

Be it known that I, NICHOLAS GRANDE, a citizen of the United States, residing at New York city, borough of Manhattan, in the county and State of New York, have invented a certain new and useful Milk-Bottle Receptacle, of which the following is a specification.

This invention is a milk bottle receptacle adapted to be mounted in fixed position exteriorly of a house and in convenient position to receive a milk bottle adapted to be deposited therein by the milkman.

The object of the invention is to provide a receptacle wherein a milk bottle may be freely and unobstructedly positioned by the milkman, but which is so constituted that the act of introducing the milk bottle into the receptacle will effect a closing and locking of the receptacle and thus preclude the subsequent surreptitious removal of the milk bottle by unauthorized persons.

Structures of this general character have been heretofore suggested, but they all have been more or less complicated in construction. The present invention in contradistinction is of unusually simple construction, economical to manufacture and efficient in its operation.

In its preferred practical form the receptacle of the present invention embodies a casing provided in the top thereof with an aperture through which the milk bottle may be introduced. With the aperture is associated a slide which is pivotally connected to one arm of a bell crank member, pivoted at its elbow interiorly of the casing. The parts are so constituted that the bell crank member normally partakes of a position to hold the slide retracted so as to permit of the introduction of the bottle, but when a bottle is introduced it is adapted to engage with and rest upon one arm of the bell crank and through its weight effect the oscillation of the bell crank for the purpose of moving the slide into a position to seal the introduction aperture. A snap catch is associated with the bell crank so as to lock it in aperture closing position.

The casing may be provided with a door having a lock, the key of which is in the possession of the housewife so that she may unlock the door, remove the bottle and reset the parts in position to receive the next milk bottle.

Features of the invention, other than those adverted to, will be apparent from the hereinafter detailed description and claims, when read in conjunction with the accompanying drawings.

The accompanying drawings illustrate one practical embodiment of the present invention, but the construction therein shown is to be understood as illustrative, only, and not as defining the limits of the invention.

Figure 3:
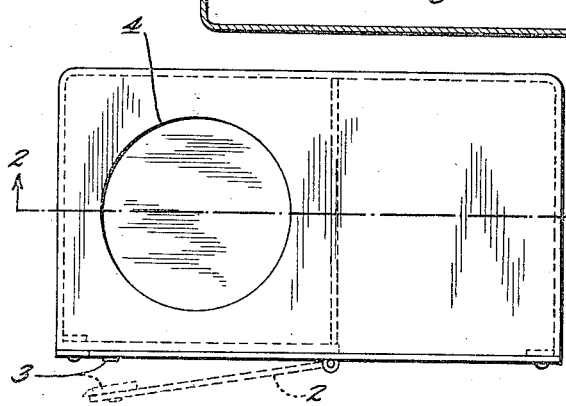
Figure 3 is a plan view of the device as shown in Figure 2.

The milk bottle receptacle of the present invention embodies a casing 1, preferably constructed from sheet metal and provided at one side thereof with a hinged door 2 adapted to be normally closed and secured by a lock 3, as shown in Figure 3. The top of the casing is provided adjacent one side thereof with an opening 4 through which a bottle is adapted to be introduced into the casing.

Associated with the under side of the top of the casing are a pair of guides 5, with which cooperates a slide 6. The slide 6 is in the form of a plate adapted to be slid back and forth on the guides 5 for the purpose of sealing or unsealing the receiving aperture 4. Mounted for pivotal movement on alined pivots 7 interior of the casing is a bell crank member pivoted at its elbow on the pivots 7 and embodying two arms 8 and 9. The bell crank member is so positioned that the arm 8 will underlie the receiving opening 4 at all times, while at the free end of the upstanding arm 9, the rear end of the slide 6 is secured by means of a hinge 10. It will thus appear that through oscillation of the bell crank member, the slide 6 may be shifted into and out of sealing position with reference to the receiving opening 4.

Figure 1:
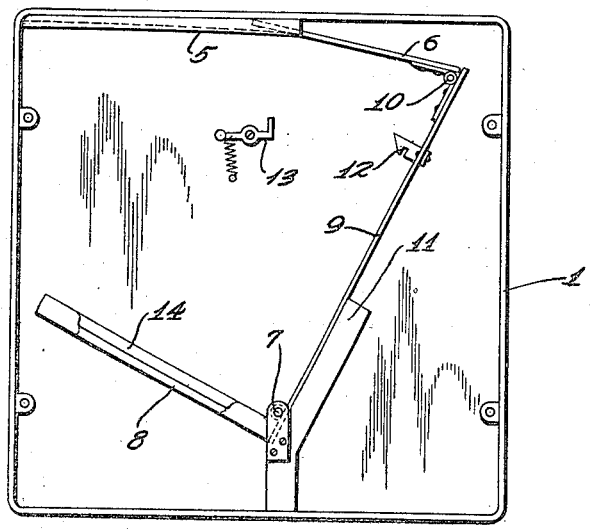
Figure 1 is a side elevation of the milk bottle receptacle showing one side wall and door thereof removed.

The normal position of the parts is as shown in full lines in Figure 1, wherein the bell crank member is tilted so as to retract the slide 6 and the parts are normally supported in this position by a back stop 11.

Figure 2:
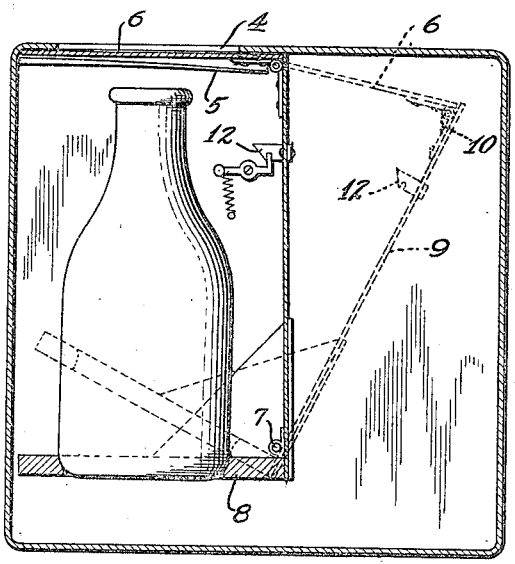
Figure 2 is a section on the line 2—2 of Figure 3.

If a milk bottle is now introduced through the opening 4, lowering of the milk bottle will cause it to engage with the arm 8 of the bell crank member and the weight of the bottle will effect a tilting of the bell crank member from the full line position of Figure 1 and the dotted line position of Figure 2 into the full line position of Figure 2, with the result that the slide 6 will be shifted into a position to seal the receiving opening 4. The arm 9 of the bell crank member is preferably provided with a catch or keeper 12, which is adapted when the parts are tilted in the manner described to engage with a spring actuated latch 13, and when these parts automatically come into engagement with one another, the bell crank member will be locked against retrograde tilting movement so that the slide will be locked in sealing position.

If the bottle has been introduced in the manner described, the slide will be locked so that surreptitious removal of the bottle is rendered impossible and the bottle will be safely housed within the casing until the housewife applies the key to the lock 3 and opens the door 2, whereupon the bottle may be removed through the door opening. In order that the bottle may properly seat on the arm 8 of the bell crank member, I preferably form the upper face of said arm with a concave seat 14, which will receive and properly support the bottle after the manner clearly shown in Figure 2. After the housewife has removed the bottle, she may reset the parts to receive another bottle the following morning by manually releasing the latch 13 and tilting the bell crank member back into the position of Figure 1. This will leave the opening 4 unsealed and permit of the introduction of a bottle subsequently.

The milk bottle receptacle of the present invention is unusually simple in construction. It embodies elementary principles of mechanics so associated with one another as to result in a device which embodies no parts which will be apt to get out of order or become broken. The device is economical to manufacture, pleasing in appearance and durable and efficient in construction.

In the foregoing detailed description of the invention and in the accompanying drawings, I have set forth a structure particularly adapted to receive and contain a milk bottle. I am aware however that the same structure may be employed to receive and contain groceries. Moreover, the device may be made on a larger scale to adapt it to receive milk cans so that the milkman delivering milk cans in the morning to the stores will not have to leave the cans outside, but can leave them safely deposited within a locked container. Furthermore the container shown in the drawings embodies a single compartment, yet a number of these containers may be secured together in a group or built within a common casing, so as to contain a plurality of different articles.

The parts may be constructed entirely of wood, entirely of metal or from wood and metal combined. For these reasons, the invention is to be understood as not limited to the specific showing, but as broadly novel as is commensurate with the appended claims.

Having thus fully described the invention, what I claim as new and desire to secure by Letters Patent is:

1. A milk bottle container embodying a casing provided at its top with a receiving opening, a slide mounted for sliding movement on the inner side of said top and adapted to be slid into and out of registration with the opening to seal or unseal the same, a bell crank provided with arms of unequal length and pivoted at its elbow within the casing with its shorter arm directly beneath the receiving opening in the top of the casing and its longer arm positioned at substantially right angles to said shorter arm and having pivotal connection with the slide, the bell crank being normally positioned to retract the slide, whereby a bottle dropped through the receiving opening in the top of the casing will fall directly upon the shorter arm of the bell crank and the weight of said bottle will cause the bell crank to be tilted to automatically move the slide into registration with the opening to seal the same, and a normally locked door in said casing adapted to be opened by the housewife to permit of removal of the bottle and the resetting of the parts into bottle receiving condition.

2. A milk bottle container embodying a casing provided at its top with a receiving opening, a slide mounted for sliding movement on the inner side of said top and adapted to be slid into and out of registration with the opening to seal or unseal the same, a bell crank provided with arms of unequal length and pivoted at its elbow within the casing with its shorter arm directly beneath the receiving opening in the top of the casing and its longer arm positioned at substantially right angles to said shorter arm and having pivotal connection with the slide, the bell crank being normally positioned to retract the slide, whereby a bottle dropped through the receiving opening in the top of the casing will fall directly upon the shorter arm of the bell crank and the weight of said bottle will cause the bell crank to be tilted to automatically move the slide into registration with the opening to seal the same, means for locking the closure in sealing position until the parts are reset, and a normally locked door in said casing adapted to be opened by the housewife to permit of removal of the bottle and the resetting of the parts into bottle receiving condition.

3. A milk bottle container embodying a casing provided at its top with a receiving opening, a slide mounted for sliding movement on the inner side of said top and adapted to be slid into and out of registration with the opening to seal or unseal the same, a bell crank provided with arms of unequal length and pivoted at its elbow within the casing with its shorter arm directly beneath the receiving opening in the top of the casing and its longer arm positioned at substantially right angles to said shorter arm and having pivotal connection with the slide, the bell crank being normally positioned to retract the slide, whereby a bottle dropped through the receiving opening in the top of the casing will fall directly upon the shorter arm of the bell crank and the weight of said bottle will cause the bell crank to be tilted to automatically move the slide into registration with the opening to seal the same, means for locking the closure in sealing condition until the parts are reset, and a normally locked door in said casing adapted to be opened by the housewife to permit of removal of the bottle and the resetting of the parts into bottle receiving condition, said shorter arm of the bell crank being provided in its upper face with a seat adapted to receive the bottle and support the same in upright position.

In testimony whereof I have signed the foregoing specification.

NICHOLAS GRANDE.